United States Patent [19]
Ganzel et al.

[11] Patent Number: 5,741,050
[45] Date of Patent: Apr. 21, 1998

[54] SWITCHABLE FAST-FILL HYDRAULIC CIRCUIT FOR USE IN VEHICLE BRAKING SYSTEMS

[75] Inventors: Blaise J. Ganzel; Gerald M. Sivulka, both of Ann Arbor, Mich.

[73] Assignee: Kelsey-Hayes Company, Romulus, Mich.

[21] Appl. No.: 516,784

[22] Filed: Aug. 18, 1995

[51] Int. Cl.⁶ ........................... B60T 13/16
[52] U.S. Cl. ............. 303/10; 303/115.4; 303/116.1; 303/113.2
[58] Field of Search ............... 303/10, 11, 139, 303/115.4, 116.1, 113.4, 113.2

[56] References Cited

U.S. PATENT DOCUMENTS

| | | |
|---|---|---|
| 4,957,330 | 9/1990 | Morikawa et al. ............ 303/115.4 |
| 5,215,359 | 6/1993 | Burgdorf et al. ............ 303/115.4 X |
| 5,330,258 | 7/1994 | Hoshoya et al. ............ 303/115.4 X |
| 5,472,266 | 12/1995 | Volz et al. ............ 303/116.1 |

*Primary Examiner*—Lee W. Young
*Attorney, Agent, or Firm*—MacMillan, Sobanski & Todd, LLC

[57] ABSTRACT

An antilock/traction control/vehicle stability braking system hydraulic circuit using a fluid flow intensifier to provide a rapid application of fluid pressure to brakes during a TC/vehicle stability control operation at a flow rate that is greater than is normally available from an ABS pump alone. The intensifier increases the fluid flow as a function of using a stepped piston operating within respective input and output chambers having different effective diameters. The intensifier also includes an intermediate chamber into which fluid dumped from a brake cylinder is drawn rather than being lost to a master cylinder reservoir. The fluid thus remains in the hydraulic circuit, ensuring that a desired ratio of pedal travel versus pressure is maintained after a transition from TC/vehicle stability braking to ABS-base braking.

2 Claims, 4 Drawing Sheets

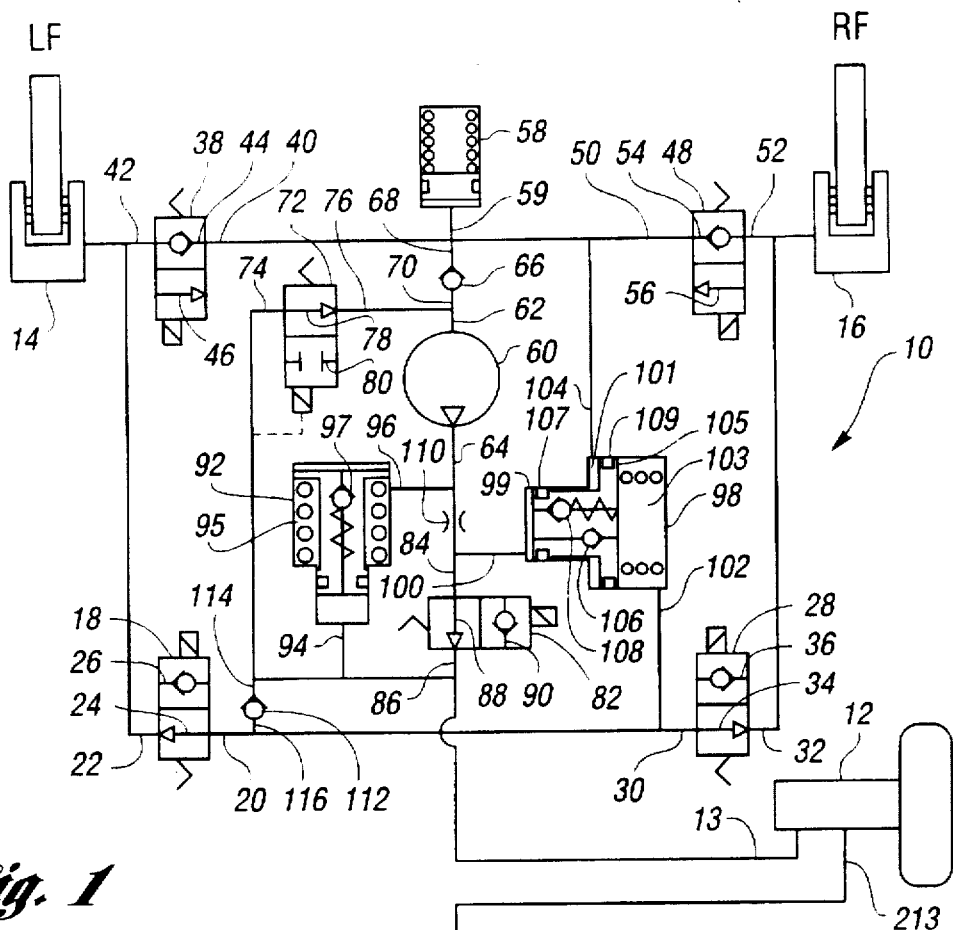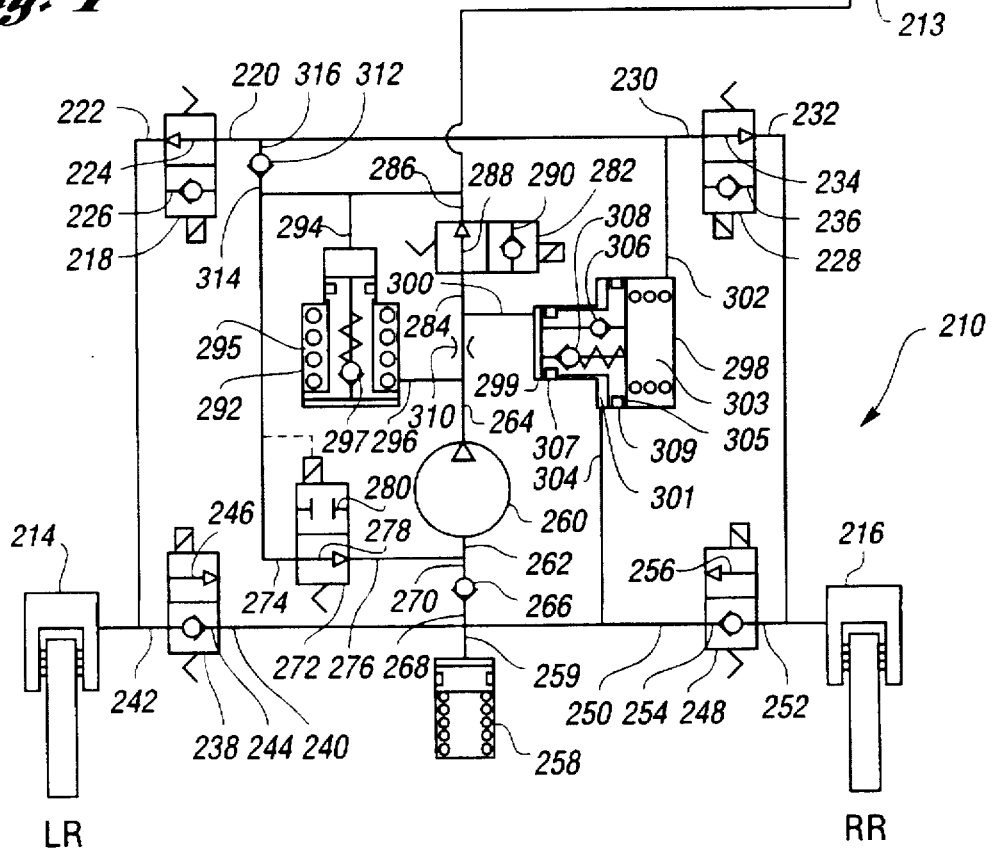
Fig. 1

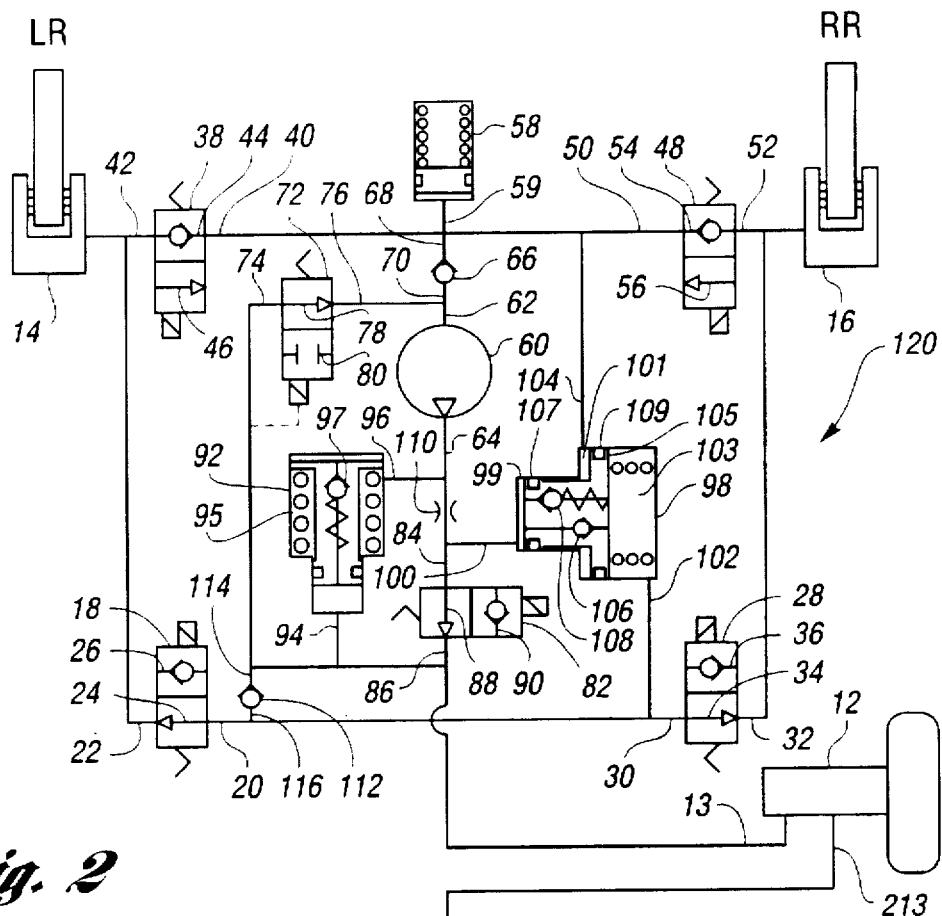
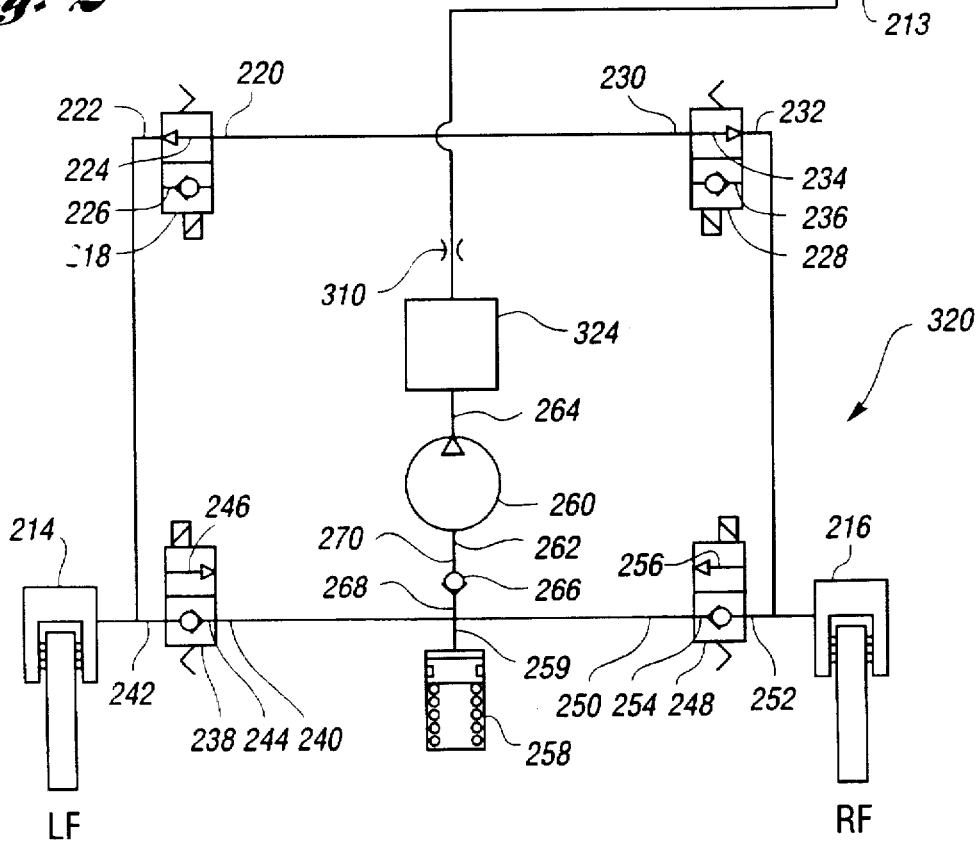
Fig. 2

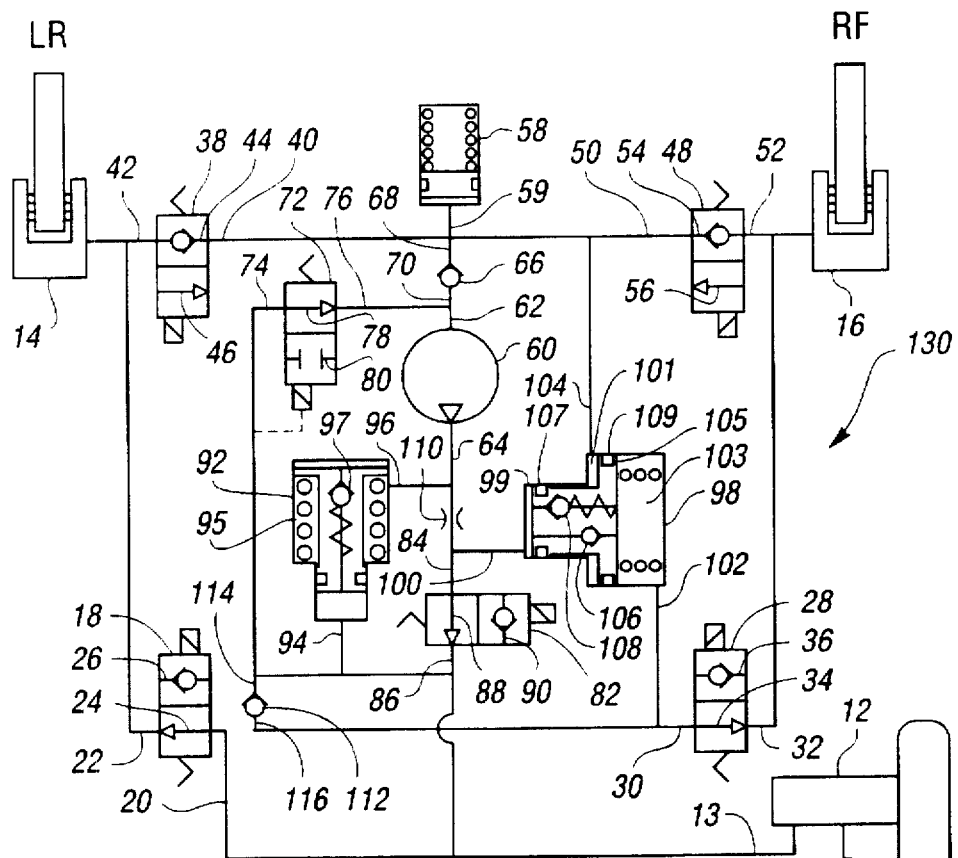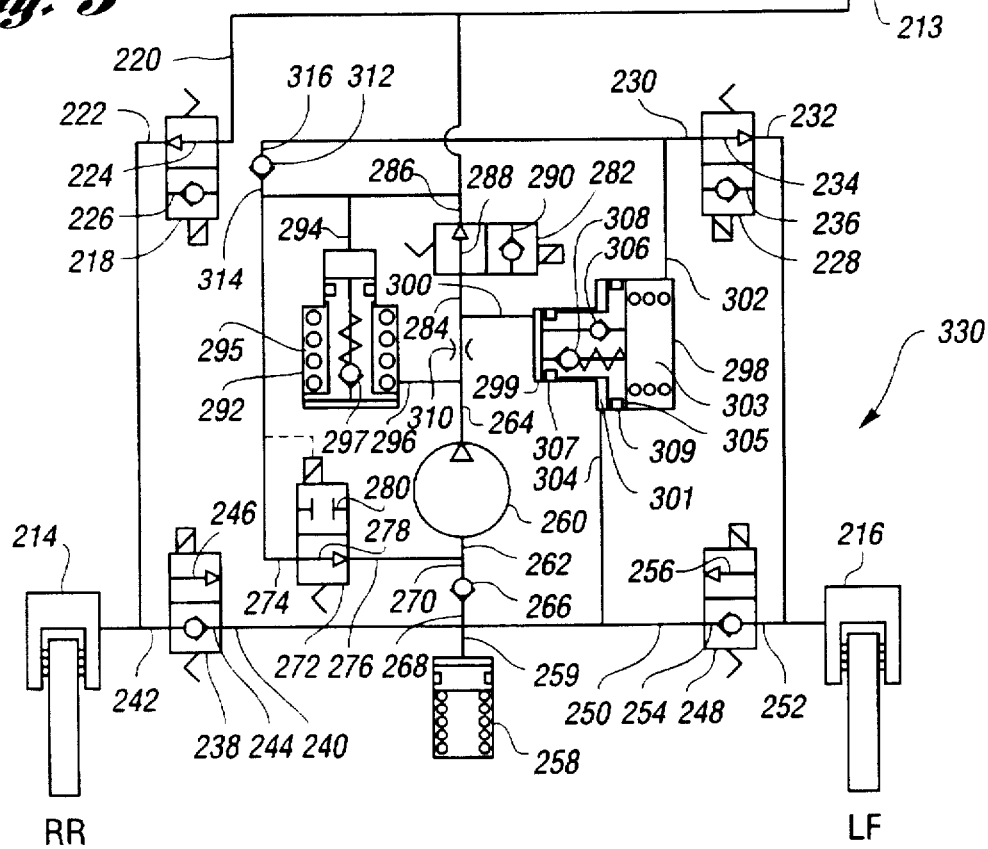

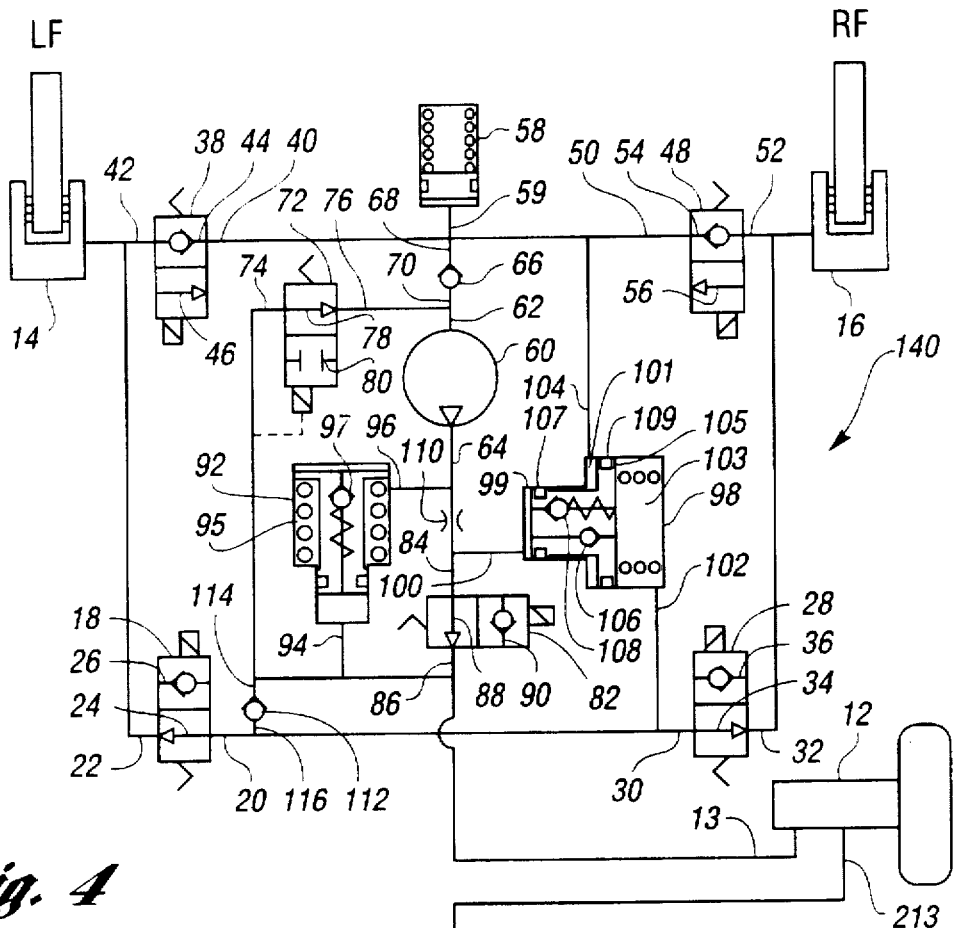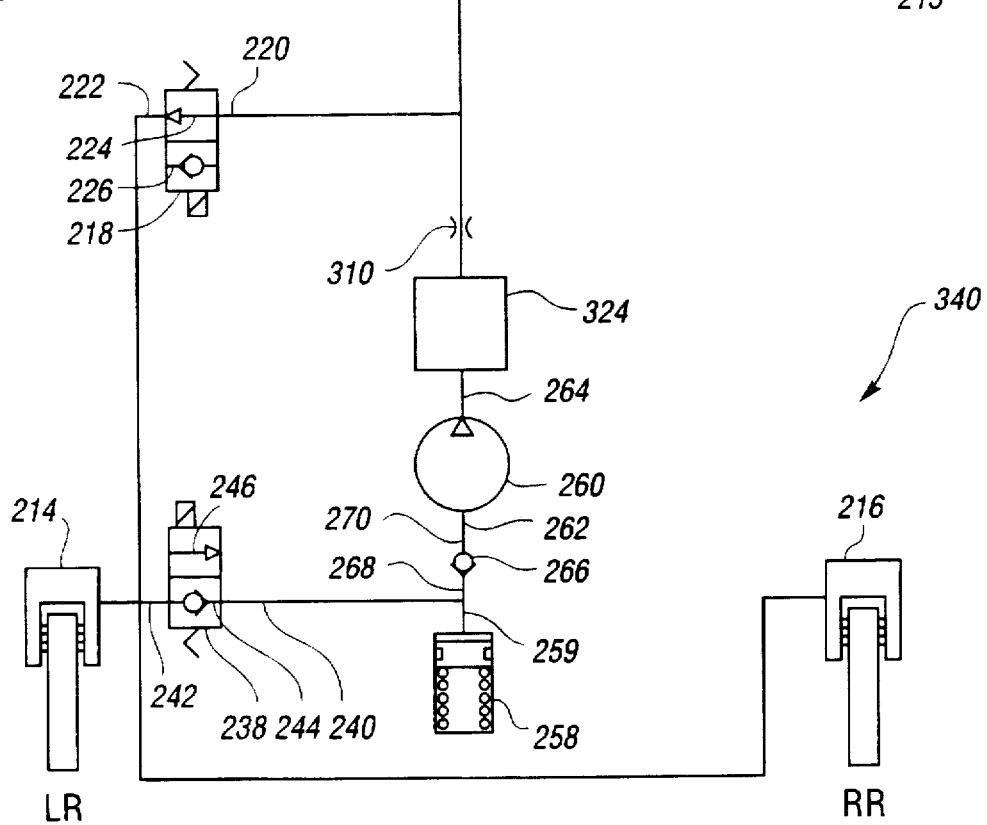
Fig. 4

5,741,050

1

SWITCHABLE FAST-FILL HYDRAULIC CIRCUIT FOR USE IN VEHICLE BRAKING SYSTEMS

TECHNICAL FIELD

This invention relates generally to fast-fill hydraulic circuits used in vehicle braking systems and specifically to switchable fast-fill hydraulic circuits used in vehicle braking systems equipped with antilock braking, traction control and vehicle stability control as an integrated system.

BACKGROUND ART

Previous systems attempting to use fluid pressurized by existing means to supply antilock braking (ABS), traction control (TC) and vehicle stability control as one system applied pressure to brakes at a rate that was less than desirable and no greater than that normally available from an antilock braking system pump.

While such systems function with a certain degree of efficiency, none disclose the advantages attending the use of the switchable fast-fill hydraulic circuit of the present invention, as is hereinafter more fully described.

DISCLOSURE OF THE INVENTION

An object of the present invention is to provide, for use in an ABS/TC/vehicle stability braking system, a switchable fast-fill hydraulic circuit that provides a rapid application of pressure to the brakes— at a greater rate than is normally available from an ABS pump alone—during TC/vehicle stability braking operation.

A feature of the present invention is that the hydraulic circuit uses a stepped fluid flow intensifier piston to draw fluid dumped from a brake cylinder into an intermediate chamber rather than lose the fluid to a master cylinder reservoir.

An advantage of the present invention is that fluid drawn into the intermediate chamber in the fluid flow intensifier remains in the circuit, ensuring that a desired ratio of pedal travel versus pressure is maintained after a transition from TC/vehicle stability braking to ABS-base braking.

In realizing the aforementioned and other objects, features and advantages, the switchable fast-fill hydraulic circuit of the present invention, described as applied to control a left and a right wheel of a vehicle, in both a vertical split system and a diagonal split system, includes a left and a right, normally open, wheel cylinder isolation valve, each having an input port. Each wheel cylinder isolation valve also has an output port respectively connected to a left and to a right wheel cylinder.

The circuit also includes a left and a right, normally closed dump valve, each having an output port. Each dump valve also has an input port connected to one of the respective output ports of the left and right wheel cylinder isolation valves and to one of the respective left and right wheel cylinders. A low pressure accumulator is also provided, a low pressure accumulator port thereof being connected to an output port of both of the dump valves.

Also included in the circuit is a low pressure accumulator check valve having an input port connected to the low pressure accumulator port and to an output port of both of the dump valves. The check valve also has an output port. A hydraulic pump has an input port connected to the output port of the check valve and also has an output port.

A normally open pilot valve is included in the circuit and has an output port connected to the input port of the

2 hydraulic pump. The pilot valve also has an input port. A normally open traction control isolation valve is also included and has an output port connected to the input port of the pilot valve and to a pressurizing chamber output port of a master cylinder. The traction control isolation valve also has an input port connected through a flow restrictor to the output port of the hydraulic pump. An isolation check valve has an input connected to the output port of the traction control isolation valve and to the input port of the pilot valve, and it has an output connected to the input ports of both of the left and right wheel cylinder isolation valves.

The circuit also includes a high pressure accumulator having a high pressure accumulator port connected to the output port of the traction control isolation valve and having a spring cavity input port connected to the output port of the hydraulic pump. The high pressure accumulator further includes a high pressure accumulator bypass valve.

Also included is a fluid flow intensifier, which includes therewithin a slidable stepped intensifier piston. The fluid flow intensifier includes an input chamber having an input chamber port connected to the input of the traction control isolation valve. It further includes an annular intermediate chamber having an intermediate chamber port connected to the low pressure accumulator port and an output chamber having an output chamber port connected to the input port of both wheel cylinder isolation valves. The fluid flow intensifier also includes an intensifier check valve, and an intensifier bypass valve, both being connected between the input chamber and the output chamber.

These and other objects, features and advantages of the present invention are readily apparent from the following detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which like reference characters indicate corresponding parts in all the views, wherein:

FIG. 1 is a schematic diagram illustrating two switchable fast-fill hydraulic control circuits of the present invention wherein the configuration of the combination shown is of a vertical-split and, alternatively, a diagonal-split, four-channel ABS/TC/vehicle stability control circuit;

FIG. 2 is a schematic diagram similar to that shown by FIG. 1, wherein the configuration of the combination shown is of a vertical-split, four-channel ABS control, two-channel TC/vehicle stability control circuit;

FIG. 3 is a schematic diagram similar to that shown by FIG. 1, wherein the configuration of the combination shown is of a diagonal-split, four-channel ABS control, two-channel TC/vehicle stability control circuit; and FIG. 4 is a schematic diagram similar to that shown by FIG. 1, wherein the configuration of the combination shown is of a vertical-split, three-channel ABS control, two-channel TC/vehicle stability control circuit.

BEST MODE FOR CARRYING OUT THE INVENTION

FIG. 1 of the drawings schematically shows the preferred embodiment of a switchable fast-fill hydraulic control circuit for use in an antilock/traction control/vehicle stability braking system (ABS/TC/"VSM") system. "VSM" is a trademark of Kelsey-Hayes Company, the assignee of the present invention. Two control circuits, which are essentially identical, are shown cooperating to form what can be used as a either a vertical-split or as a diagonal-split, four-channel ABS/TC/"VSM" control circuit. The two control circuits are generally indicated by respective reference numerals 10 and 210, each being shown connected to control one of two sets of two wheel cylinders.

As will be recognized by those skilled in the art of the present invention, the two control circuits, 10 and 210, could be configured, as shown by FIG. 1, so that one control circuit 10 controls both front wheel cylinders and the other control circuit 210 controls two rear wheel cylinders. This configuration represents the previously mentioned vertical-split, four-channel ABS/TC/"VSM" control circuit. The control circuits could alternatively be configured (not shown) so that one control circuit controls a left front wheel cylinder and a right rear wheel cylinder, and the other control circuit controls the remaining front and rear wheel cylinders. The alternative configuration would represent the previously mentioned diagonal-split, four-channel ABS/TC/"VSM" control circuit.

The elements of one control circuit 10 are duplicates of the other control circuit 210 except that the latter are identified by reference numerals that are 200 units higher. One control circuit 10 connects to a secondary pressurizing chamber output port 13 of a master cylinder 12, and the other control circuit 210 connects to a primary pressurizing chamber output port 213 of the master cylinder 12. This configuration provides both front and rear brake cylinders with ABS/TC/"VSM" control. Since each of the control circuits, 10 and 210, comprise the same elements and operate in the same manner only one control circuit 10 is described in detail.

Illustrated is a left wheel cylinder 14 and a right wheel cylinder 16. A left wheel cylinder isolation valve 18 has an input port 20, an output port 22, a normally open path 24, and a check valve path 26. Its output port 22 is connected to the left wheel cylinder 14. A right wheel cylinder isolation valve 28 has an input port 30, an output port 32, a normally open path 34, and a check valve path 36. Its output port 32 is connected to the right wheel cylinder 16.

Also shown is a normally closed left wheel cylinder dump valve 38 having an output port 40, an input port 42, a check valve path 44, and an open path 46. The input port 42 of the dump valve 38 is connected to the left wheel cylinder 14 and to the output port 22 of the isolation valve 18. A normally closed right wheel cylinder dump valve 48 has an output port 50, an input port 52, a check valve path 54, and an open path 56. The input port 52 of dump valve 48 is connected to the right wheel cylinder 16 and to the output port 32 of isolation valve 28.

A low pressure accumulator 58 having a low pressure accumulator port 59 is shown connected to the output port 40 of dump valve 38 and to the output port 50 of dump valve 48. The characteristics of the low pressure accumulator 58 used in this circuit can vary depending on circuit application and on the characteristics of other components and are chosen so that its maximum pressure is sufficiently low to ensure that, on low-friction surfaces, the pressure is below that which would lock the brakes.

A hydraulic pump 60 has an input port 62 and an output port 64. A low pressure accumulator check valve 66 is shown having an input port 68 connected to the low pressure accumulator port 59, to the output port 40 of dump valve 38, and to the output port 50 of dump valve 48.

The low pressure accumulator check valve 66 also has an output port 70 connected to the input port 62 of pump 60. A pilot valve 72 has an input port 74, an output port 76, a normally open path 78 and a closed path 80. The output port 76 of the pilot valve 72 is connected to the input port 62 of the hydraulic pump 60 and to the output port 70 of the low pressure accumulator check valve 66. The operating characteristics of the pilot valve 72 used in this circuit can vary depending on circuit application and on the characteristics of other components and are chosen so that the pilot valve 72 is actuatable by a pressure that is low enough not to invoke ABS control but high enough to guarantee that the pilot valve 72 opens when the master cylinder is released and also high enough that pressure pulses do not close the valve.

Also included is a fluid flow intensifier 98, which slidably includes therewithin a stepped intensifier piston 105. It also includes an input chamber 99 having an input chamber port 100, an annular intermediate chamber 101 having an intermediate chamber port 104 and an output chamber 103 having an output chamber port 102. The fluid flow intensifier 98 further includes an intensifier check valve 106, which provides a return for brake fluid in the output chamber 103 when brakes are released, and an intensifier bypass valve 108, both being connected between the input chamber 99 and the output chamber 103.

The output chamber 103 of the present invention has a volume of 0.35 cubic inch. The areas at the sealing diameters of the stepped intensifier piston 105 of the first preferred embodiment of the present invention have a 1:3 ratio. It should be understood by those skilled in the art that, as dictated by characteristics required by similar circuits designed for other specific applications, the volume of the output chamber 103 and the ratio of the areas at the sealing diameters of the stepped intensifier piston 105 of the first preferred embodiment of the invention could be different.

Shown also is a traction control/vehicle stability management (TC/"VSM") isolation valve (hereinafter referred to as the traction control isolation valve) 82 having an input port 84, an output port 86, a normally open path 88, and a check valve path 90. Its output port 86 is connected to the input port 74 of pilot valve 72. A traction control/vehicle stability management (TC/"VSM") high pressure accumulator (hereinafter referred to as the high pressure accumulator) 92 has a high pressure accumulator output port 94 and a spring cavity input port 96. The characteristics of the high pressure accumulator 92 used in this circuit can also vary depending on circuit application and on the characteristics of other components and are chosen so that its maximum pressure is, in view of a 1:3 ratio of the fluid flow intensifier 98, three times the intensifier pressure.

The high pressure accumulator port 94 is connected to the output port 86 of traction control isolation valve 82, to the input port 74 of pilot valve 72, and to the secondary pressurizing chamber output port 13 of master cylinder 12. Its spring cavity input port 96 is connected to the output port 64 of the hydraulic pump 60. The high pressure accumulator 92 has an accumulator volume of 0.035 cubic inch (and effectively three times that, or about 0.1 cubic inch due to the 1:3 sealing diameter ratio of the stepped intensifier piston 105). It should be understood by those skilled in the art that, as dictated by characteristics required by similar circuits designed for other specific applications, this volume could be different. The high pressure accumulator 92 has a spring cavity 95 that is also used as an ABS attenuator. The high pressure accumulator 92 includes a high pressure accumulator bypass valve 97, which opens against the bias of a spring (not shown) when the high pressure accumulator is full.

The output chamber port 102 of fluid flow intensifier 98 is connected to the input port 20 of left wheel cylinder isolation valve 18 and to input port 30 of the right wheel cylinder isolation valve 28, and its intermediate chamber port 104 is connected to the low pressure accumulator port 59. A flow restrictor 110 is hydraulically connected at one end to the input chamber port 100 of fluid flow intensifier 98 and to the input port 84 of traction control isolation valve 82, and connected at its other end to the output port 64 of pump 60 and to the spring cavity input port 96 of high pressure accumulator 92.

The characteristics of the intensifier bypass valve 108 must be such that the fluid flow intensifier 98 is resettable. To ensure this, the pressure below which the intensifier bypass valve 108 must actuate is defined by the equation $$P_{IBV} = P_{HPA} - \frac{P_{HPA}}{I_{FFI}}$$

where:

$P_{IBV}$ is the actuation pressure of the intensifier bypass valve, $P_{HPA}$ is the maximum pressure of the high pressure accumulator, and $I_{FFI}$ is the intensification factor of the fluid flow intensifier.

The ratio $$\frac{P_{HPA}}{I_{FFI}}$$

represents the pressure at which the fluid flow intensifier output 103 must be for the fluid flow intensifier 98 to be in equilibrium.

In the first preferred embodiment, for example, given a high pressure accumulator pressure of 2500 psi and a fluid flow intensification factor of 3 (the ratio of the areas at the sealing diameters of the stepped intensifier piston 105), the bypass pressure must therefore be less than $$2500 \text{ psi} - \frac{2500 \text{ psi}}{3} = 1667 \text{ psi}.$$

to allow the fluid flow intensifier 98 to reset. Maximizing the pressure of the intensifier bypass valve maximizes available brake pressure during a TC/"VSM" operation.

Also shown is an isolation check valve 112 having an input port 114 and an output port 116. Its input port 114 is connected to the high pressure accumulator port 94 of the high pressure accumulator 92, to the output port 86 of the traction control isolation valve 82, and to the input port 74 of the pilot valve 72; and its output port 116 is connected to the input ports 20 and 30 respectively of isolation valves 18 and 28.

The left wheel cylinder isolation valve 18, the right wheel cylinder isolation valve 28, the left dump valve 38, the right dump valve 48, and the traction control isolation valve 82 are each actuated by an electric solenoid, the solenoids being controlled by one of any well-known automotive electronic control units (not shown) designed for this purpose.

In the subsequent description of the operation of the hydraulic circuit of the present invention, values of various fluid pressures, volumes and ratios are used to describe the operation of a specific, preferred embodiment of the invention. It should be understood that these values are functions of the components chosen for specific applications and could therefore vary within reasonable ranges without departing from the spirit and scope of the invention.

During typical pedal feedback, antilock brake system (ABS) operations, the normally open pilot valve 72 is actuated, halting fluid flow therethrough. The high pressure accumulator 92 and the fluid flow intensifier 98 remain in their normal positions. The traction control isolation valve 82 also remains unactuated.

During a traction control/vehicle stability management operation, however, the traction control isolation valve 82 is actuated but the pilot valve 72 is not. This alters the functions of the hydraulic circuit. As a consequence, the hydraulic pump 60 can draw fluid directly from the master cylinder 12 through the normally open path 78 of the pilot valve 72. Brake pressure can be increased to levels above master cylinder pressure. The high pressure accumulator bypass valve 97 limits the output pressure of the hydraulic pump 60 to 2,500 psi.

The intensifier bypass valve 108 limits fluid pressure at the output chamber port 102 of the fluid flow intensifier 98, and also in the brake lines, to 1,000 psi. This equals the difference between the maximum 2,500 psi output pressure of the hydraulic pump 60 and the 1,500 psi pressure of the intensifier bypass valve 108 (a pressure sufficiently below the maximum allowable pressure of 1667 psi given in the foregoing example. Given that the areas at small sealing diameter 107 and at large sealing diameter 109 of the stepped intensifier piston 105 have a 1:3 ratio, and neglecting standard circuit losses, a fast-fill function can operate, as described by the following paragraphs, at fluid pressures up to 750 psi.

The force $F_1$ acting on the fluid flow intensifier input chamber port 100 is equal to the product of the area $A_1$ at the small sealing diameter 107 of the stepped intensifier piston 105 and the pressure $P_1$ appearing there ($F_1=A_1 \times P_1$). Likewise, the force $F_2$ acting on the fluid flow intensifier output chamber port 102 is equal to the product of the area $A_2$ at the large sealing diameter 109 of the stepped intensifier piston 105 and the pressure $P_2$ appearing there ($F_2=A_2 \times P_2$). The forces $F_1$ and $F_2$ applied respectively to the fluid flow intensifier input chamber port 100 and output chamber port 102 are equal ($F_1=F_2$) when the stepped intensifier piston 105 is not being urged to translate. The area $A_2$ at the large sealing diameter 109 of the stepped intensifier piston 105 is three times the area $A_1$ at the small sealing diameter 107 of the stepped intensifier piston 105 ($3A_1=A_2$). The pressure $P_1$ appearing at the small sealing diameter 107 of the stepped intensifier piston 105 is 1,500 psi greater than the pressure $P_2$ appearing at the large sealing diameter 109 of the stepped intensifier piston 105 ($P_1=P_2+1,500$ psi).

Combining and factoring the foregoing equations discloses that the pressure $P_2$ appearing at the large sealing diameter 109 of the stepped intensifier piston 105 is equal to 750 psi. Given the pressure $P_2$ appearing at the large sealing diameter 109 of the stepped intensifier piston 105, it also discloses that the pressure $P_1$ appearing at the small sealing diameter 107 of the stepped intensifier piston 105 is equal to 2,250 psi, which is less than the 2,500 psi maximum output pressure of the hydraulic pump 60.

When isolation valves 18 and 28 are actuated and the pressure $P_1$ appearing at the small sealing diameter 107 of the stepped intensifier piston 105 is 2,500 psi, then the pressure $P_2$ appearing at the large sealing diameter 109 of the stepped intensifier piston 105 is 1,000 psi. This equals the difference between the maximum 2,500 psi output pressure of the hydraulic pump 60 and the 1,500 psi pressure of the intensifier bypass valve 108.

Given its 1:3 area ratio, for the intensifier 98 to be in a state of equilibrium, the pressure $P_1$ appearing at the small sealing diameter 107 of the stepped intensifier piston 105 must equal three times the pressure $P_2$ appearing at the large sealing diameter 109 of the stepped intensifier piston 105, that is, 3,000 psi. Since it does not, the force $F_2$ acting on the output side of the stepped intensifier piston 105 is greater than the force $F_1$ acting on the input side thereof. This results in the stepped intensifier piston 105 translating in the direction of the intensifier input chamber port 100.

Whenever brake pressure is being applied to the brakes during a traction control/vehicle stability management (TC/"VSM") operation, however, the stepped intensifier piston 105 is translating in the direction of the intensifier output chamber port 102. As this occurs, fluid pressure at the intermediate chamber port 104 and, therefore, within the low-pressure accumulator 58 is reduced to a level below atmospheric pressure. This ensures that fluid dumped from the left and right wheel cylinders 14 and 16 respectively through the open paths 46 and 56 of the actuated dump valves 38 and 48 is drawn into the intermediate chamber 101 of the fluid flow intensifier 98 rather than being returned to the reservoir of the master cylinder 12, making the fluid readily available to the system to ensure that a desired ratio of pedal travel versus pressure is maintained after a transition from TC/"VSM" to ABS-base braking.

During a traction control/vehicle stability management (TC/"VSM") to base brake/antilock brake system (ABS) transition, this readily available fluid can be used by the pump to prevent pedal drop. In cooperation with the low pressure accumulator check valve 66, the connection between the intermediate chamber port 104 and the low pressure accumulator 58 also improves the efficiency of the pump by ensuring that the stepped pressure intensifier piston operation does not create pressure below atmospheric at the pump input. A redundant pressure switch (not shown), to facilitate the return of brake control to the driver, can be added as an additional feature.

FIG. 2 of the drawings schematically shows the preferred embodiment of a switchable fast-fill hydraulic control circuit for use in another ABS/TC/"VSM" system. The control circuit, generally indicated by reference numeral 120, and a representative ABS control circuit, generally indicated by reference numeral 320, are shown cooperating to form a vertical-split, four-channel ABS control, two-channel TC/"VSM" control circuit.

The ABS control circuit 320 provides ABS control to the left and right supplemental wheel cylinders, 214 and 216. In this control circuit 320, there is shown an element not included in FIGS. 1 and 3, namely, an attenuator 324. It is connected between the fluid pump 260 and the flow restrictor 310 and comprises a small vessel containing a volume of brake fluid. The slight compressibility of the brake fluid enables the attenuator 324 to perform as an accumulator to reduce the pulsations appearing at the opposite side of the flow restrictor 310. In the control circuits, shown in this and other figures, that are not exclusively ABS control circuits, the spring cavity 95 of the high pressure accumulator 92 functions as an ABS attenuator.

The preferred control circuit 120 provides ABS/TC/"VSM" control to the left and right wheel cylinders, 14 and 16. As will be recognized by those skilled in the art of the present invention, the two control circuits, 120 and 320, could be configured in the preferred manner shown by FIG. 2 or could also be configured (not shown) so that the left and right supplemental wheel cylinders, 214 and 216, are provided with ABS/TC/"VSM" control by the control circuit 320; and the left and right wheel cylinders, 14 and 16, are provided only with ABS control by the ABS control circuit 320.

FIG. 3 of the drawings schematically shows the preferred embodiment of a switchable fast-fill hydraulic control circuit for use in yet another ABS/TC/"VSM" system. Two control circuits, which are essentially identical, are shown cooperating to form a diagonal-split, four-channel ABS control, two-channel TC/"VSM" control circuit. The two control circuits are generally indicated by respective reference numerals 130 and 330.

As shown by FIG. 3, the preferred control circuit 130 provides ABS/TC/"VSM" control to a wheel cylinder 16 associated with a right front (RF) wheel and provides ABS control to a wheel cylinder 14 associated with a left rear (LR) wheel; and the other preferred control circuit 330 provides ABS/TC/"VSM" control to a supplemental wheel cylinder 216 associated with a left front (LF) wheel and provides ABS control to a supplemental wheel cylinder 214 associated with a right rear (RR) wheel.

As will be recognized by those skilled in the art of the present invention, the two control circuits, 130 and 330, could be configured in the preferred manner as shown n by FIG. 3 or could also be configured (not shown) so that each control circuit, 130 and 330, controls the opposite respective set of wheel cylinders. This would provide wheel cylinders associated with front wheels, for example, with only ABS control and wheel cylinders associated with rear wheels with ABS/TC/"VSM" control.

FIG. 4 of the drawings schematically shows the preferred embodiment of a switchable fast-fill hydraulic control circuit for use in still another ABS/TC/"VSM" system. The control circuit, generally indicated by reference numeral 140, and a representative ABS control circuit, generally indicated by reference numeral 340, are shown cooperating to form a vertical-split, three-channel ABS control, two-channel TC/"VSM" control circuit.

The ABS control circuit 340 provides ABS control to the supplemental wheel cylinders, 214 and 216, which are both controlled by the same supplemental wheel cylinder isolation valve 218 and supplemental dump valve 238. In this control circuit 340, there is shown an attenuator 324 not included in FIGS. 1 and 3. A description of its operation has been included in the description of the control system shown by FIG. 2.

The preferred control circuit 140 provides ABS/TC/"VSM" control to the wheel cylinders, 14 and 16, associated with front wheels. As will be recognized by those skilled in the art of the present invention, the two control circuits, 140 and 340, could be configured in the preferred manner shown by FIG. 4 or could also be configured (not shown) so that the supplemental wheel cylinders, 214 and 216, are provided with ABS/TC/"VSM" control by the control circuit 140; and the front wheel cylinders are provided only with ABS control by the ABS control circuit 340.

While the best mode for carrying out the invention has been described in detail, those familiar with the art to which this invention relates will recognize various alternative designs and embodiments for practicing the invention as defined by the following claims.

What is claimed is:

1. A switchable fast-fill hydraulic control circuit for use in an antilock/traction control/vehicle stability braking system, the circuit comprising:

at least one normally open wheel cylinder isolation valve having an input port and an output port;

at least one normally closed dump valve having an input port connected to the output port of the at least one wheel cylinder isolation valve and to at least one wheel brake cylinder, the at least one dump valve further having an output port;

a low pressure accumulator having a low pressure accumulator port connected to the output port of the at least one dump valve;

a hydraulic pump having an input port and an output port;

a low pressure accumulator check valve having an input port connected to the low pressure accumulator port and having an output port connected to the input port of the hydraulic pump;

a normally open pilot valve having an output port connected to the input port of the hydraulic pump and having an input port;

a normally open traction control isolation valve having an output port connected to a pressurizing chamber output port of a master cylinder and to the input port of the pilot valve, the traction control isolation valve further having an input port;

a high pressure accumulator having a high pressure accumulator port connected to the output port of the traction control isolation valve and having a spring cavity input port connected to the output port of the hydraulic pump, the high pressure accumulator further including a high pressure accumulator bypass valve;

a fluid flow intensifier slidably including therewithin a stepped intensifier piston and defining therein an input chamber, an input chamber port connected to the input of the traction control isolation valve, an annular intermediate chamber, an intermediate chamber port connected to the low pressure accumulator port, an output chamber, and an output chamber port connected to the input port of the at least one wheel cylinder isolation valve, the fluid flow intensifier also including an intensifier check valve and an intensifier bypass valve, both being connected between the input chamber and the output chamber;

a flow restrictor connected between the output of the hydraulic pump and the input of the traction control isolation valve; and an isolation check valve having an input port connected to the output port of the traction control isolation valve and having an output port connected to the input port of the at least one wheel cylinder isolation valve.

2. The control circuit as defined by claim 1, wherein the pressure below which the intensifier bypass valve must actuate to ensure that the fluid flow intensifier is resettable is defined by the equation $$P_{IBV} = P_{HPA} - \frac{P_{HPA}}{I_{FFI}}$$

where:

$P_{IBV}$ is the actuation pressure of the intensifier bypass valve, $P_{HPA}$ is the maximum pressure of the high pressure accumulator, and $I_{FFI}$ is the intensification factor of the fluid flow intensifier.

* * * * *